BEST AVAILABLE COPY

United States Statutory Invention Registration [19]

[11] Reg. Number: H397

Stark

[43] Published: Jan. 5, 1988

[54] MODIFIED BUBBLE INTURN MASK PERIPHERY

[75] Inventor: David C. Stark, Sierra Vista, Ariz.

[73] Assignee: The United States of America as represented by the Secretary of the Army, Washington, D.C.

[21] Appl. No.: 874,742

[22] Filed: Jun. 13, 1986

[51] Int. Cl.[4] ..... A62B 7/00
[52] U.S. Cl. ..... 128/206.24
[58] Field of Search ..... 128/206.24

[56] References Cited

U.S. PATENT DOCUMENTS

| | | | |
|---|---|---|---|
| 2,166,164 | 7/1939 | Lehmberg | 128/206.24 |
| 2,387,522 | 10/1945 | Maurer | 128/206.24 |
| 3,347,230 | 10/1967 | Cupp | 128/201.19 |
| 3,545,436 | 12/1970 | Holloway | 128/206.24 |
| 4,069,516 | 1/1978 | Watkins, Jr. | 128/206.24 |
| 4,402,316 | 9/1983 | Gadberry | 128/201.19 |
| 4,414,973 | 11/1983 | Matheson et al. | 128/206.24 |
| 4,595,003 | 6/1986 | Shoemaker et al. | 128/201.19 |

FOREIGN PATENT DOCUMENTS

| | | | |
|---|---|---|---|
| 605400 | 11/1934 | Fed. Rep. of Germany | 128/206.24 |
| 155000 | 6/1938 | Fed. Rep. of Germany | 128/206.24 |
| 661740 | 6/1938 | Fed. Rep. of Germany | 128/206.24 |

*Primary Examiner*—Deborah L. Kyle
*Assistant Examiner*—Michael J. Carone
*Attorney, Agent, or Firm*—Anthony T. Lane; Harold H. Card, Jr.; Edward F. Costigan

[57] ABSTRACT

An improved protective face mask periphery includes an inturn having a flat portion extending inwardly of an inner surface of the face mask, and a curved bubble portion which is concave with respect to the inner surface of the face mask and which curves outwardly into engagement with the wearer's face. The face mask periphery thus forms a good seal with the wearer's face while at the same time being comfortable to wear.

5 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PRIOR ART
FIG. 1
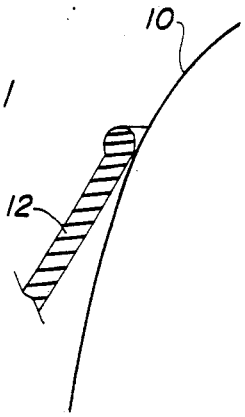
PRIOR ART
FIG. 2
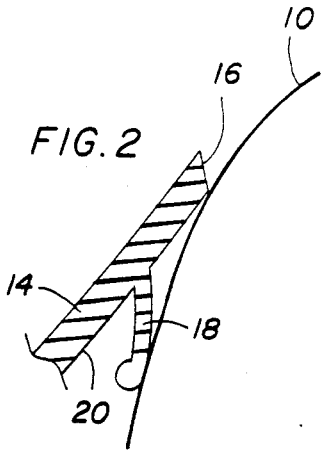
PRIOR ART
FIG. 3
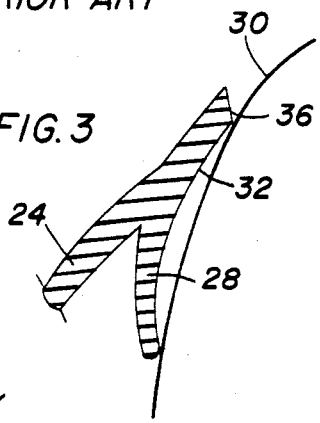
PRIOR ART
FIG. 4
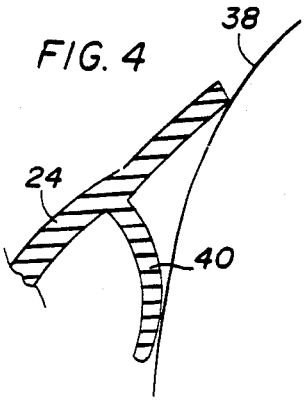
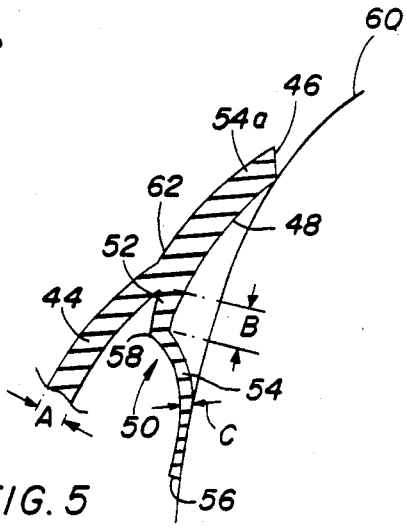
FIG. 5

MODIFIED BUBBLE INTURN MASK PERIPHERY

STATEMENT OF GOVERNMENT INTEREST

The invention described herein may be manufactured, used and licensed by or for the Government for Governmental purposes without the payment to me of any royalties thereon.

FIELD AND BACKGROUND OF THE INVENTION

The present invention relates in general to gas mask design, and in particular to a new and useful design for the periphery of the gas mask which makes an efficient seal with the face of a wearer while avoiding discrete pressure areas which lead to discomfort.

The periphery or face seal of a full-face respirator or protective mask, plays a critical role in determining the effectiveness of the respiratory protection system. The periphery of a full-face respirator is that portion of the mask facepiece which contacts the wearer's skin, forming a leak-proof seal which isolates the interior of the mask, the wearer's eyes and the wearer's respiratory tract, from a contaminated environment. Breathing air is filtered through a chemically absorptive medium, such as activated carbon, to remove toxic materials. If the face seal is ineffective or inefficient, contaminated air can leak past the periphery, mix with the filtered air, and be inspirated, thus exposing the wearer to the hazard he or she is attempting to avoid.

The currently fielded, standard military respiratory protective masks (M9A1 Special Purpose, M17 series CB Protective masks, M24 Aviator's mask, and the M25A1 Tanker's mask) have a flat-type periphery shown in FIG. 1. The flat periphery is a very common, effective periphery design for most respirator uses, but it has limits to its effectiveness.

A more effective design for a face seal is the so-called inturn periphery. During work on extra-small (XS) M17 series masks, a bubble inturn was developed to enhance the protection of the mask (FIG. 2). The bubble inturn periphery has superior face-sealing characteristics, due to its ability to conform to facial features more readily, and its larger sealing surface. The inturn periphery as designed, however, had a serious problem with a painful pressure point (hot spot) along the centerline of the periphery, mostly at the forehead of the mask, due to the thickness of the periphery at that point. To alleviate the problem with the hot spot, the XS M17 mask returned to a flat periphery along the forehead. This eliminated the hot spot, but also reduced the effectiveness of the face seal.

During the development of a series of masks designated XM29/30, a new periphery was designed and patented by John Scavnicky and Malcolm Little, under U.S. Pat. No. 4,595,003 (which is incorporated here by reference). A flat inturn periphery as shown in FIG. 3 was used across the forehead, and a revised bubble inturn as shown in FIG. 4 was used along the cheeks of the mask. The two were blended together at the temple of the mask. This mixture of peripheries has proven to be very comfortable, and was another improvement in protection over the standard flat periphery. This is the design of the periphery which has been carried forward into a protective mask program designated the XM40.

SUMMARY OF THE INVENTION

The present invention was a result of an investigation for further improving the protection and comfort afforded the wearer by a gas mask, specifically at the periphery of the gas mask. The invention combines advantages of the flat inturn peripheries and the bubble inturn peripheries while avoiding the drawbacks of each. The inventive periphery thus avoids the hot spot problem of the bubble inturn periphery and avoids the reduced protection afforded by the flat inturn periphery. At the same time the comfort of the flat inturn periphery is retained and the high protection of the bubble inturn periphery is achieved.

Accordingly an object of the present invention is to provide an improvement for a protective face mask having a face piece with an inner surface for facing inwardly of a wearer, and an outer surface for facing outwardly of the wearer, the improvement comprising an inturn connected to and extending inwardly of the inner surface of the face piece at locations spaced from the periphery of the face piece, the inturn having a substantially flat portion having one end connected to the inner surface of the face piece and extending substantially tangentially to the inner surface of the face piece, the flat portion having an outer end, and a bubble portion having one end connected to the outer end of the flat portion and an outer end for engagement against a wearer's face, the bubble portion being curved concavely with repect to the inner surface of the face piece so that the bubble portion curves outwardly against the face of the wearer.

A further object of the present invention is to provide the improved inturn only at the periphery of the face piece for engaging the forehead of the wearer.

A still further object of the invention is to provide a periphery for a face mask which is highly efficient in precluding the entrance of outside contaminants while being comfortable to wear. A further object of the invention is to provide an improved gas mask periphery which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a fragmentary sectional view showing a peripheral portion of the face piece for a protective face mask of conventional design;

FIG. 2 is a view similar to FIG. 1 showing an improved face piece having an XS-M17-style bubble inturn periphery;

FIG. 3 is a view similar to FIG. 1 of a face mask having an improved flat inturn periphery for engagement against the forehead of a wearer;

FIG. 4 is a view similar to FIG. 1 of an improved face mask having a modified bubble inturn for engagement against the cheeks of a wearer; and FIG. 5 is a view similar to FIG. 1 showing the improved inturn periphery of the present invention.

DESCRIPTION OF THE PREFERRED EMBODIMENT

FIG. 5 illustrates the peripheral area of a gas mask having an improved inturn periphery of the present invention. Before discussing FIG. 5 in detail, reference is first made to FIGS. 1–4.

In FIG. 1 the peripheral area 12 of a protective face mask is shown engaged against part of the face 10 of a wearer. FIG. 2 shows a face piece 14 for a face mask having an outer periphery 16 and a bubble inturn 18. Bubble inturn 18 is curved concavely with respect to an inner surface 20 of face piece 14 so that the inturn 18 curves outwardly into engagement with the wearer's face 10.

FIGS. 3 and 4 show different cross-sectional areas of the periphery of an improved face mask made in accordance with the above-identified patent to Scavnicky and Little. FIG. 3 shows the area of a face piece 24 which is engaged over the forehead 30 of a wearer. A flat inturn 28 extends inwardly from the inner surface of the face piece 24. Flat inturn 28 extends substantially tangentially to the inner surface 32 of the face piece 24 adjacent the outer periphery 36 of the face piece.

FIG. 4 shows a section of the face piece 24 which is meant for engagement against the cheeks 38 of the same wearer as in FIG. 3. At this area of the face piece, a bubble inturn 40 is provided which extends concavely with respect to the inner surface of the face piece and curves outwardly into engagement with the cheeks 38 of the wearer.

According to the present invention as illustrated in FIG. 5, the face piece 44 is made of a rubberlike or elastic synthetic material having a selected thickness A. The thickness A dominates all the way to the outer periphery 46 of the face piece 44.

According to the invention, an inturn generally designated 50 is connected to the inner surface 48 of face piece 44. Inturn 50 has a flat inturn portion 52 which has a length from the inner surface 48 labeled B. The flat inturn portion 52 is connected at its outer end to the inner surface 48 of the face piece 44. A bubble inturn portion 54 is connected to an outer end of flat inturn portion 52. Bubble inturn portion 54 is curved concavely with respect to the inner surface of face piece 44 and curves away from periphery 46, into engagement with the face 60 of a wearer.

The inturn has a thickness labeled C which tapers gradually toward the outer end 56 of the inturn 50.

Inturn portions 52 and 54 of inturn 50 meet at a bend 58. The face piece 44 also has a slight bend 62 between an outer peripheral portion 54A of face piece 44, and the remainder of face piece 44.

The flat inturn portion 52 extends substantially tangentially with respect to the inner surface 48 of face piece 44, at least in the area of the peripheral portion 44*a*. The bubble inturn portion 54 at its line of connection with portion 52 extends at an angle to portion 52.

In a preferred form of the invention, the face piece 44 has a thickness A of 0.1 inches. The length of flat inturn portion 52 from its inner junction with surface 48, shown at B, is preferably 0.125 inches.

The maximum thickness C of bubble portion 54 is 0.07 inches and this tapers down at end 56 to about 0.045 inches. Inturn 50 has a radius of about 0.035 at end 56.

The inventive inturn 50 of the present invention is advantageously applied only to the forehead area of the face piece 44, the remaining portions of the face piece having a bubble inturn as shown in FIG. 4. Alternatively the entire periphery of face piece 44 can be provided with the inventive inturn 50.

Actual tests to determine the effectiveness of the inventive periphery were conducted and revealed a substantial increase in the confidence level for the face mask. The face mask had improved effectiveness in precluding outside contaminants and also improved comfort factors for the wearer.

By utilizing the flat inturn portion 52 along part of the length of inturn 50, the inturn as a whole can easily bend outwardly of the wearer's face and thus avoid the hot spot experienced in face masks having a periphery as shown at FIG. 2.

At the same time a good seal is made with the wearer's face because of the curved bubble inturn portion 54.

While a specific embodiment of the invention has been shown and described in detail to illustrate the application of the principles of the invention, it will be understood that the invention may be embodied otherwise without departing from such principles.

What is claimed is:

1. In a protective face mask having a face piece with an inner surface for facing inwardly of a wearer and an outer surface for facing outwardly of the wearer, the face piece having a periphery, the improvement comprising an inturn connected to and extending inwardly from the inner surface of the face piece at a location spaced from the periphery, the inturn extending away from the periphery and having a flat portion connected directly to the inner surface of the face piece and extending substantially tangentially to the inner surface of the face piece, and a curved bubble portion connected to the flat portion and concave with respect to the inner surface of the face piece so as to curve outwardly into engagement with a wearer's face.

2. An improved protective face mask according to claim 1 wherein the face piece has a forehead portion, said inturn being connected only at the forehead portion.

3. An improved face mask according to claim 1 wherein the flat portion is connected to the bubble portion at a bend.

4. The improved face mask according to claim 3 wherein the flat portion has a length of about 0.125 inches.

5. An improved face mask according to claim 4 wherein the face piece has a thickness of about 0.1 inches and the inturn has a maximum thickness of about 0.07 inches, the inturn tapering outwardly toward an outer end of said bubble portion which is faced away from the periphery.

* * * * *